United States Patent
Okada et al.

(10) Patent No.: US 9,645,024 B2
(45) Date of Patent: May 9, 2017

(54) METHOD OF CALIBRATING MULTI COMPONENT FORCE DETECTOR PROVIDED IN ROLLING RESISTANCE TESTING MACHINE

(75) Inventors: Toru Okada, Hyogo (JP); Takayuki Fukuda, Hyogo (JP)

(73) Assignee: Kobe Steel, Ltd., Hyogo (JP)

( * ) Notice: Subject to any disclaimer, the term of this patent is extended or adjusted under 35 U.S.C. 154(b) by 974 days.

(21) Appl. No.: 13/990,028

(22) PCT Filed: Dec. 16, 2011

(86) PCT No.: PCT/JP2011/079201
§ 371 (c)(1),
(2), (4) Date: May 28, 2013

(87) PCT Pub. No.: WO2012/086547
PCT Pub. Date: Jun. 28, 2012

(65) Prior Publication Data
US 2013/0262014 A1    Oct. 3, 2013

(30) Foreign Application Priority Data
Dec. 24, 2010  (JP) ................. 2010-288252

(51) Int. Cl.
*G01L 5/16* (2006.01)
*G01L 25/00* (2006.01)
*G01M 17/02* (2006.01)

(52) U.S. Cl.
CPC .......... *G01L 5/16* (2013.01); *G01L 25/00* (2013.01); *G01M 17/022* (2013.01)

(58) Field of Classification Search
CPC ............. G01L 5/16; G01L 25/00; G01M 17/013–17/02
See application file for complete search history.

(56) References Cited

U.S. PATENT DOCUMENTS

| 4,134,292 A | 1/1979 | Honlinger et al. |
| 4,748,844 A | 6/1988 | Yoshikawa et al. |

(Continued)

FOREIGN PATENT DOCUMENTS

| DE | 2709682 A1 | 9/1978 |
| EP | 1336833 A2 | 8/2003 |

(Continued)

OTHER PUBLICATIONS

Germana Paterlini, "Rolling Resistance Validation", Jul. 2015, Minnesota Department of Transportation, 2015-39, pp. 1-44.*

(Continued)

*Primary Examiner* — Mischita Henson
(74) *Attorney, Agent, or Firm* — Studebaker & Brackett PC (57) ABSTRACT

To calibrate a crosstalk correction coefficient of a multi-component force detector provided in a rolling resistance testing machine. A method of calibrating a multi-component force detector provided in a rolling resistance testing machine includes a spindle shaft attached with a tire, a running drum with a simulated road surface for pressing the tire thereon, and a rotation torque meter provided in a rotation shaft of the running drum, wherein when performing a process of calculating a force acting on the tire from a measurement value of the multi-component force detector using a crosstalk correction coefficient for calibrating an influence of crosstalk occurring in the multi-component force detector, the crosstalk correction coefficient is calibrated by using a rolling test data including a rotation torque measured by the rotation torque meter and a force measured by the multi-component force detector.

6 Claims, 4 Drawing Sheets

(56) References Cited

U.S. PATENT DOCUMENTS

| | | |
|---|---|---|
| 7,832,288 B2 | 11/2010 | Caretta et al. |
| 2002/0104366 A1 | 8/2002 | Sinnett |
| 2003/0154778 A1 | 8/2003 | Meinen |
| 2009/0125251 A1 | 5/2009 | Caretta et al. |
| 2011/0000292 A1 | 1/2011 | Yoshikawa et al. |

FOREIGN PATENT DOCUMENTS

| | | | |
|---|---|---|---|
| EP | 1336833 | A3 | 3/2006 |
| EP | 2249138 | A1 | 11/2010 |
| JP | 59-151032 | A | 8/1984 |
| JP | 61-116637 | A | 6/1986 |
| JP | 62-263434 | A | 11/1987 |
| JP | 2003-004598 | A | 1/2003 |
| JP | 2003-294554 | A | 10/2003 |
| JP | 2006-084310 | A | 3/2006 |
| JP | 2006-119000 | A | 5/2006 |
| JP | 2010-139470 | A | 6/2010 |
| WO | 2005108945 | A1 | 11/2005 |
| WO | 2010/101159 | A1 | 9/2010 |

OTHER PUBLICATIONS

Sauret et al., "Assessment of field rolling resistance of manual wheelchairs", 2012, VA Health Care, vol. 49 No. 1, pp. 63-74.*
Wang et al., "Effect of Friciton on Rolling Tire—Pavement Interaction", no date, NEXTRANS Project No. 049IY02, pp. 1-45.*
"Simultaneous Equations"; Descartes 2D; Section:Algebra; pp. 1-7.
The extended European search report issued by the European Patent Office on May 23, 2014, which corresponds to EP11851304.3-1557 and is related to U.S. Appl. No. 13/990,028.
International Search Report; PCT/JP2011/079201; Feb. 7, 2012.
Written Opinion of the International Searching Authority; PCT/JP2011/0079201; Feb. 7, 2012.
Japanese Office Action "Notification of Reason for Refusal" dated Jan. 15, 2013, which corresponds to Japanese Patent Application No. 2010-288252 and is related to U.S. Appl. No. 13/990,028; with translation.

* cited by examiner

METHOD OF CALIBRATING MULTI COMPONENT FORCE DETECTOR PROVIDED IN ROLLING RESISTANCE TESTING MACHINE

TECHNICAL FIELD

The present invention relates to a method of calibrating a multi-component force detector provided in a rolling resistance testing machine.

BACKGROUND ART

A rolling resistance of a tire is one of important measurement items for measuring characteristics and performances of tires for a truck, an automobile, and the other vehicles. The rolling resistance of the tire is a force acting between the tire and the ground surface in the tangential direction, and is measured as a force Fx (a change in the rolling resistance Fx when a pressing load Fz is changed) acting between a test tire and a simulation road surface of a drum or the like in the tangential direction in a rolling resistance testing machine.

A typical method of measuring the rolling resistance Fx is a method using a drum type rolling resistance testing machine. The drum type rolling resistance testing machine is configured to measure a relation between the pressing load Fz and the rolling resistance Fx by a multi component force detector (load cell) provided in a spindle shaft supporting a tire while the tire is pressed against a simulation road surface formed in the outer periphery of a running drum.

Specifically, in a case where the rolling resistance Fx is measured, the load fx in the rolling resistance direction is measured by the multi-component force detector provided in the spindle shaft, and Fx may be calculated by "Fx=fx(L/Rd)" (a load method). Here, Rd indicates the radius of the running drum, and L indicates the distance between the axes of the running drum and the tire spindle shaft.

Incidentally, in the rolling resistance testing machine, there is a need to calibrate the multi-component force detector when using the testing machine. In addition, when the multi-component force detector is used for a long period of time, a detection value may have an error. Thus, for example, the multi-component force detector needs to be calibrated every predetermined usage period.

Various methods of calibrating the multi component force detector have been developed. However, as illustrated in Patent Document 1, a calibration may be performed after adding a test load in respective directions using a weight of a given mass. Further, as illustrated in Patent Document 2 or Patent Document 3, there is disclosed a method of performing a calibration by applying an external force through a highly precise load detector.

CITATION LIST

Patent Document

Patent Document 1: JP 59-151032 A
Patent Document 2: JP 61-116637 A
Patent Document 3: JP 2003-4598 A

SUMMARY OF INVENTION

Technical Problem

Incidentally, in a measurement instrument that simultaneously measures a plurality of forces (a translation load component or a moment component) as in the multi-component force detector, a phenomenon called "crosstalk" occurs in which a load (a false load) is measured even in a direction different from the direction of the originally applied load.

Particularly, in the multi-component force detector provided in the rolling resistance testing machine, the crosstalk causes a problem in which a pressing load influences a rolling load.

That is, the pressing load Fz of the tire becomes a load which is generally an order of about 100 times of the rolling resistance Fx, and the lateral force Fy of the tire becomes a load which is an order of about 10 times of Fx. Further, since the axis of the tire is present at a position offset from the multi component force detector due to the structure thereof, the moment mx acts with a relatively large value on the multi component force detector due to the load Fz. Thus, the influence of the crosstalk may not be ignored, and the output value fx' in the x direction of the multi component force detector is influenced by the load other than the x direction, so that a correct value cannot be obtained. Further, if the direction of applying the axial load (pressing load) is deviated even slightly, the test condition changes, so that the calibration test may not be satisfactorily performed. For example, for applying the axial load Fz of 5000 N, when an error of 0.1° exists in the pressing direction, a load of 9 N is unnecessarily applied in the x direction, so that the test condition becomes different from the desired test condition. Of course, in such an unstable test condition, it is difficult to highly precisely calibrate the crosstalk correction coefficient.

In order to investigate the crosstalk, it is conceivable to, by using the technique of Patent Document 1, apply a method a given load in the x direction so as to measure the influence of the loads in the directions of the y axis and the z axis. However, in this method, a calibration test for Fy and Fz or Mx, My, and Mz is needed in addition to fox as a value to be applied to the multi component force detector, and hence time and effort are required. Thus, this method is not practical.

Patent Documents 2 and 3 described above disclose a part of a method of calibrating the multi component force detector taking the influence of the crosstalk into consideration, but do not disclose a specific approach. Thus, the technique cannot be employed to the actual industrial field.

The present invention is derived in view of the above-described problems, and it is an object of the present invention to provide a calibration method that enables simple and highly precise calibration of a crosstalk correction coefficient of a multi component force detector provided in a rolling resistance testing machine.

Means for Solving Problem

In order to attain the above-described object, the invention devises the following technical means.

That is, according to an aspect of the invention, there is provided a method of calibrating a multi-component force detector provided in a rolling resistance testing machine including a spindle shaft attached with a tire and a running drum with a simulated road surface for pressing the tire thereon, in which when performing a process of calculating a force acting on the tire from a measurement value of the multi-component force detector using a crosstalk correction coefficient for calibrating an influence of crosstalk occurring in the multi-component force detector, the crosstalk correction coefficient is calibrated by using "rolling test data"

obtained by the multi-component force detector and Equation obtained on the assumption that two rolling resistances acting on the multi-component force detector in different conditions are equal to each other in forward and backward states.

The inventor has considered that the rolling resistances should be equal to each other at the same speed and the same load, for example, when the tire rotates forward at the front surface and rotates backward at the rear surface. When the measurement value of the multi-component force detector is calibrated in the axial direction with sufficient precision, an influence of the crosstalk caused by the action of the other loads may be exemplified as an error factor included in the measurement value. Accordingly, the crosstalk coefficient may be calculated (calibrated) on the condition that the rolling resistances applied to the tire are equal to each other at the forward and backward states.

Desirably, the two rolling resistances may indicate the rolling resistance of the tire which is attached in the front surface direction and rotates forward and the rolling resistance of the tire which is attached in the rear surface direction and rotates backward.

More desirably, the two rolling resistances may indicate the rolling resistance of the tire which is attached in the front surface direction and rotates forward and the rolling resistance of the tire which is attached in the front surface direction and rotates backward.

Furthermore, the spindle shaft may be attached with the multi-component force detector, and when the multi-component force detector is able to measure a load fx in the x axis, a load fz in the z axis, and a moment mx about the x axis on the assumption that the tangential direction of the running drum is set as the x axis, the axis direction of the spindle shaft is set as the y axis, and the direction of the load applied to the tire is set as the z axis, the crosstalk correction coefficients of fz and nix with respect to fx may be calibrated by using the "rolling test data" which include fx, fz, and mx and are linearly independent from one another.

Further, the spindle shaft may be attached with the multi-component force detector, and when the multi-component force detector is able to measure a load fx in the x axis, a load fz in the z axis, a load fy in the y axis, and a moment mx about the x axis on the assumption that the tangential direction of the running drum is set as the x axis, the axis direction of the spindle shaft is set as the y axis, and the direction of the load applied to the tire is set as the z axis, the crosstalk correction coefficients of fz, fy and mx with respect to fx may be calibrated by using the "rolling test data" which include fx, fz, fy, and mx and are linearly independent from one another.

Furthermore, a "differential load" may be obtained by subtracting a measurement value of the multi-component force detector obtained when pressing the tire at a load different from a test load from a measurement value of the multi-component force detector obtained when pressing the tire against the running drum at the test load, and the crosstalk correction coefficient may be calibrated by using the "obtained differential load" as the "rolling test data".

Effect of the Invention

According to the method of calibrating a multi-component force detector provided in a rolling resistance testing machine of the invention, it is possible to simply and highly precisely calibrate the crosstalk correction coefficient of the multi-component force detector provided in the rolling resistance testing machine.

DESCRIPTION OF EMBODIMENTS

Hereinafter, a rolling resistance testing machine 1 provided with a multi component force detector which is calibrated by a calibration method according to the present invention will be described with reference to the drawings.

A rolling resistance testing machine 1 of the present invention includes a cylindrical running drum 3 of which the outer peripheral surface is provided with a simulation road surface 2 on which a tire T (test tire) runs and a carriage 4 that presses the tire T against the simulation road surface 2 of the running drum 3. The carriage 4 is a slide base which is provided with a spindle shaft 5 rotatably holding the tire T, and is disposed so as to be away from the running drum 3 in the horizontal direction.

Figure 1A:
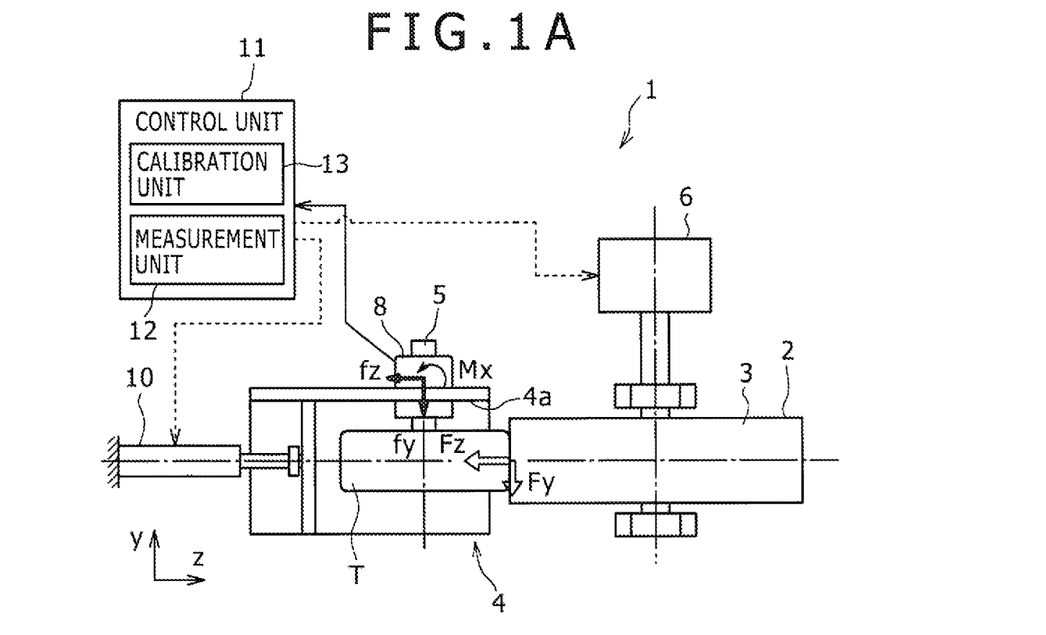
FIG. 1A is a plan view of a rolling resistance testing machine provided with a multi-component force detector which is calibrated by a calibration method of the invention.
Figure 1B:
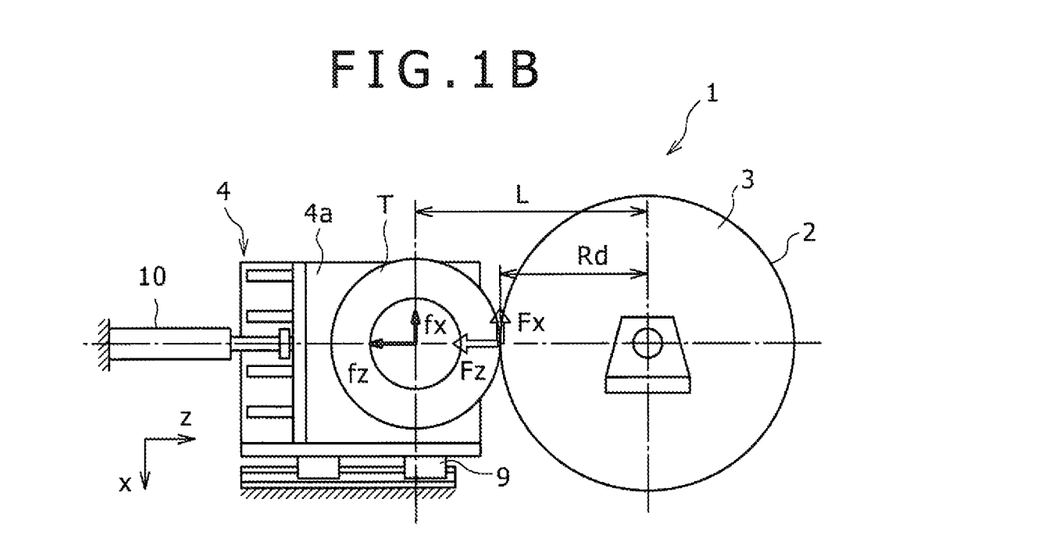
FIG. 1B is a front view of the rolling resistance testing machine of FIG. 1A.

In the description below, the left side of FIG. 1B is set as the left side and the right side of FIG. 1B is set as the right side when describing the rolling resistance testing machine 1.

The running drum 3 is a cylindrical body which is rotatably attached to a shaft set along the horizontal direction perpendicular to the left to right direction, and the outer peripheral surface thereof is provided with the endless simulated road surface 2 on which the tire T may roll. The rotation shaft of the running drum 3 is attached with a motor 6 which rotates the running drum 3, and the running drum 3 may be driven by the motor 6.

Meanwhile, the carriage 4 is a slide base with a structure having an excellent rigidity so as not to be easily deformed even when a load is applied thereto. A hollow cylindrical housing 8, into which the spindle shaft 5 is inserted, is provided in a vertical wall portion 4a of the carriage 4 in a manner that the axis of the carriage 4 is parallel to the axis of the running drum 3. The spindle shaft 5 is rotatably inserted into the inner peripheral surface of the housing 8 through a bearing 15.

A linear guide 9 which moves horizontally along the left to right direction in the carriage 4 is provided at the lower portion of the carriage 4. Further, a hydraulic cylinder 10 which moves the carriage 4 in the horizontal direction and may press the tire T attached to the spindle shaft 5 against the running drum 3 is disposed at the left side of the carriage 4.

Figure 2:
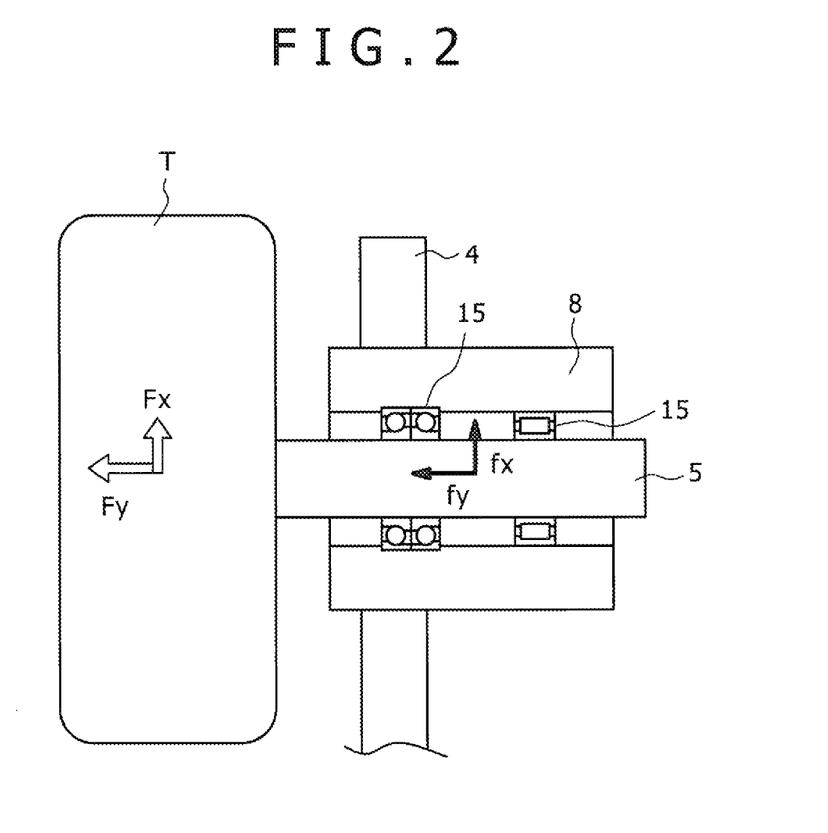
FIG. 2 is an enlarged view of a spindle shaft.

Furthermore, the above-described spindle shaft 5 is a shaft member that may hold the tire T at the front end thereof, and is attached to the cylindrical housing 8 while being rotatably inserted into a shaft facing the horizontal direction. The rotation axis of the spindle shaft 5 is disposed so as to be parallel to the rotation axis of the running drum 3 at the same height in the up to down direction. Here, when the carriage 4 is moved horizontally the tire T attached to the spindle shaft 5 is pressed against the simulated road surface 2 of the running drum 3 from the normal direction thereof. A multi-component force detector is attached to the housing 8 which rotatably supports the spindle shaft 5.

The multi-component force detector (not illustrated) is formed in a disk shape in appearance, and includes a plurality of beam members (distorted elements) which extend radially from the center in the radial direction and load cells which are attached thereto. The bearing 15 is disposed at the center of the multi-component force detector, and the multi-component force detector rotatably supports the spindle shaft 5. The outer peripheral portion of the multi-component force detector is connected to the end of the housing 8.

By setting the coordinate axes illustrated in FIGS. 1A and 1B, that is, the z axis facing the movement direction (the axial load application direction) of the carriage 4, the y axis identical to the axis of the spindle shaft 5, and the x axis facing the direction perpendicular to the z axis and the y axis and the tangential direction of the outer periphery of the running drum 3, the multi-component force detector includes two or more components including at least fx and fz among the loads (fx, fy, and fz) along the coordinate axes and the moments (mx, my, and mz) about the coordinate axes. Furthermore, when expressing the force acting on the tire T, the capital letter F is used (for example, Fx, Fy, and Fz).

The measurement values of the load and the torque measured by the multi-component force detector are transmitted to a control unit 11.

As illustrated in FIG. 1A, the control unit 11 controls the hydraulic cylinder 10 which presses the carriage 4 against the running drum 3 or the motor 6 which rotationally dives the running drum 3.

Further, the control unit 11 includes a measurement unit 12 which calculates an actual rolling resistance Fx and the like based on the measurement data measured by the multi component force detector. The measurement unit 12 receives a load measurement value or a torque measurement value such as fx', fz', and mx' measured by the multi component force detector and calculates the load fx by using Equation (1) to be described later. Furthermore, in Equation (1), the coefficients a, b, and the like exist, but these coefficients a and b are the coefficients for correcting the influence of the crosstalk in the multi component force detector. To accurately learn the coefficients a and b, that is, to accurately calibrate the coefficients a and b is essentially needed to accurately calculate fx in the measurement unit 12.

In the case where the rolling resistance testing machine 1 is used for a long period of time even when the coefficients a, b, and the like are accurately calibrated, the value fx or the like becomes not accurate, so that the actual rolling resistance Fx is not obtained. Such a circumstance may be caused by various factors. However, it is considered that one of the factors is caused by the inaccurate values of the coefficients a and b.

Therefore, the control unit 11 provided in the rolling resistance testing machine 1 of the invention is provided with a calibration unit 13 which calibrates the coefficients a and b for correcting the influence of the crosstalk and accurately calculates fx.

Next, a signal process which is performed by the calibration unit 13 provided inside the control unit 11, that is, a method of calibrating the multi component force detector of the invention will be described.

A method of calibrating a multi-component force detector of the invention is performed such that a crosstalk correction coefficient is calibrated by using a "rolling test data" obtained by a multi-component force detector and Equation obtained on the assumption that two rolling resistances acting, on the multi-component force detector in different conditions are equal to each other in forward and backward states. Specifically, the first embodiment and the second embodiment are supposed depending on how to set "different conditions".

First Embodiment

First, a method of calibrating a multi-component force detector of the first embodiment will be described.

The calibration method of the first embodiment is employed when using a multi-component force detector capable of measuring fx, fz, and nix, and is performed on the assumption that the rolling resistance of the tire which is attached in the front surface direction (the tire is set at the front surface) and rotates forward and the rolling resistance of the tire which is attached in the rear surface direction (the tire is set at the rear surface) and rotates backward are equal to each other in the forward and backward states.

The calibration of the crosstalk correction coefficient a of the axial load fz with respect to fx and the crosstalk correction coefficient b of mx is performed according to the following procedure.

Figure 3:
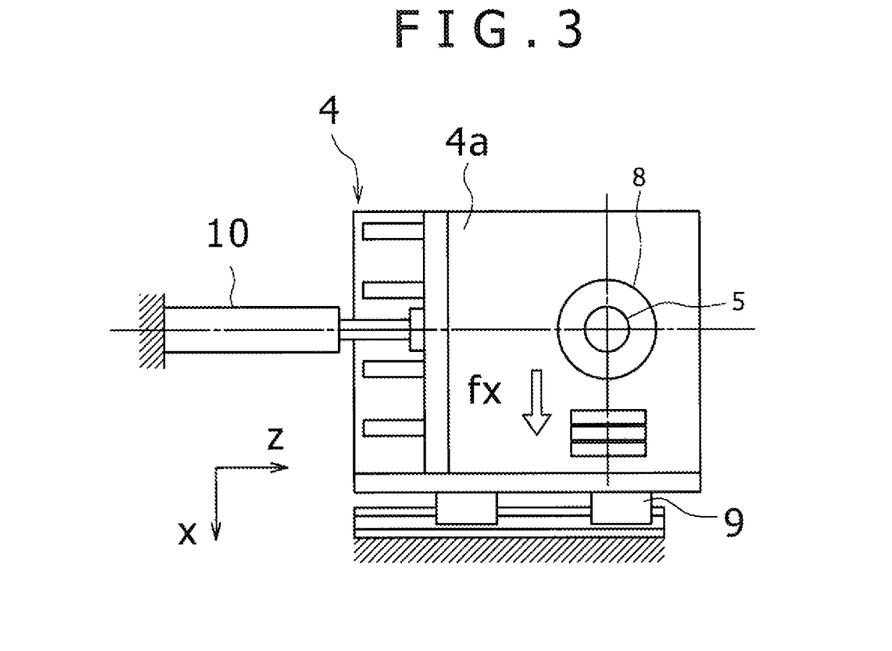
FIG. 3 is a diagram illustrating a calibration method of calibrating a load component in the x direction using a weight of a given mass.

First, as illustrated in FIG. 3, a weight of a given mass is attached to the spindle shaft 5, a load is applied in the x direction, a load applied in the same direction is measured by the multi-component force detector, and then a calibration is performed. In this way, a calibration coefficient a of the measurement value fx' of the multi-component force detector with respect to fx may be obtained.

Figure 4:
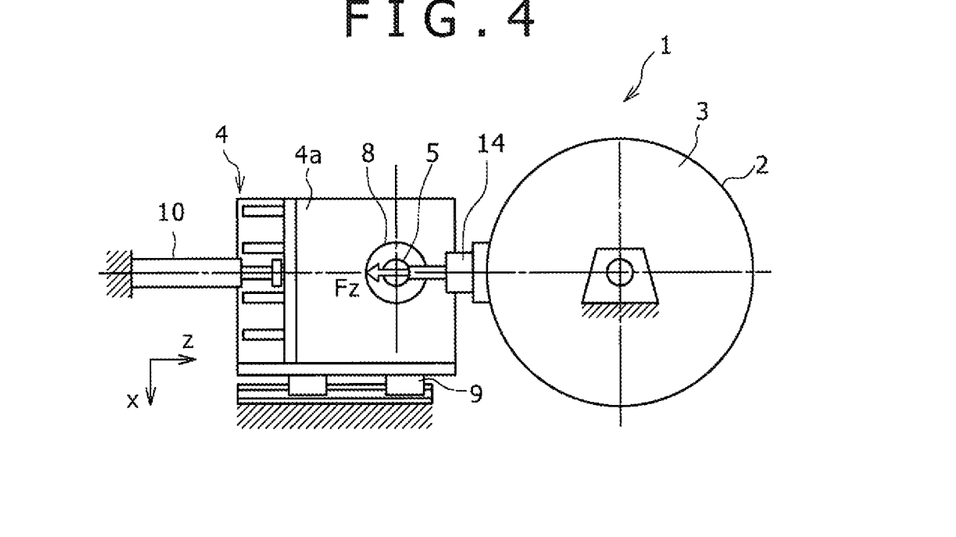
FIG. 4 is a diagram illustrating a calibration method of applying a load in the z direction.

Further, as illustrated in FIG. 4, a highly precise load detector 14 is provided between the spindle shaft 5 and the running drum 3, and the carriage 4 is operated in the direction of the running drum 3 so as to apply a pressing load fz (=Fz and a drum load) to the spindle shaft 5 in the z direction.

In this state, the actual axial load fz is calibrated by obtaining a calibration coefficient in the same way as the case of the rolling resistance from the measurement value of the load fz' output from the multi component force detector and the signal of the load fz of the load detector 14, for example.

Furthermore, in the calibration test illustrated in FIG. 4, the crosstalk correction coefficient a may be obtained. However, since the pressing load fz is a large value compared to fx, an unnecessary load of a magnitude which may not be ignored is applied in the fx direction even when a slight installation error is present in the hydraulic cylinder 10. Accordingly, it is difficult to obtain the crosstalk correction coefficient of fz' with respect to fx from the calibration test in which the load fz is applied in the z direction as illustrated in FIG. 4.

Thus, in the embodiment, the following method is employed for the calibration of the crosstalk correction coefficient.

First, the rolling resistance fxcw1' when measuring the tire T attached in the front surface direction and rotating forward by the multi-component force detector and the rolling resistance fxccw2' when measuring the tire T attached in the rear surface direction and rotating backward by the multi-component force detector are expressed as Equation (1) by using the calibration coefficient a and the crosstalk correction coefficients a and b obtained as in FIG. 3.

Furthermore, the additional character "cw" in the equation indicates the data which is measured when rotating the tire T forward, and the additional character "ccw" indicates the data which is measured when rotating the tire backward. Further, "1" indicates the data which is measured when attaching the tire T in the front surface direction, and "2" indicates the data which is measured when attaching the tire T in the rear surface direction.

$$fxcw1 = \alpha \cdot fxcw1' + a \cdot fzcw1' + b \cdot mxcw1'$$

$$fxccw2 = \alpha \cdot fxccw2' + a \cdot fzccw2' + b \cdot mxccw2' \quad (1)$$

In Equation (1), the coefficient a is a coefficient which indicates the influence degree of the crosstalk caused by the measurement value fz' in the z direction, and is a crosstalk correction coefficient of fz'. The coefficient b is a coefficient which indicates the influence degree of the crosstalk caused by the measurement value mx' of the moment about the x axis, and is a crosstalk correction coefficient of mx'.

Meanwhile, in fxcw1 and fxCcw2 obtained as described above, the measured rolling resistances are equal to each other in the forward and backward states as illustrated in Equation (a) at the same rotation speed and the same pressing load.

$$fxcw1 = -fxccw2 \quad (a)$$

Thus, Equation (2) is derived from Equation (1) and Equation (a).

$$\alpha \cdot (fxcw1' + fxccw2') + a \cdot (fzcw1' + fzccw2') + b \cdot (mxcw1' + mxccw2') = 0 \quad (2)$$

Here, since the values of the coefficients a and b are not given in Equation (2), there is a need to obtain at least two kinds or more "rolling test data" which are linearly independent from each other in order to obtain two crosstalk correction coefficients a and b. When two kinds or more "rolling test data" which are linearly independent from each other may be obtained, an independent quadratic simultaneous equation based on Equation (2) may be obtained, and hence variables a and b may be calculated.

Therefore, the calibration method of the first embodiment uses Equation (2) in which the data obtained by one tire T attached in the front surface direction and rotating forward is equal to the data obtained by the tire attached in the rear surface direction and rotting backward and Equation (3) in which the data obtained by the same tire T attached in the rear surface direction and rotating forward is equal to the data obtained by the tire attached in the front surface direction and rotating backward.

$$\alpha \cdot (fxcw2' + fxccw1') + a \cdot (fzcw2' + fzccw1') + b \cdot (mxcw2' + mxccw1') = 0 \quad (3)$$

Furthermore, since Equation (3) is derived in the same manner as in the case of deriving Equation (2), the description will not be repeated.

When at least two "rolling test data" are provided, the crosstalk correction coefficients a and b may be calculated. However, it is desirable to sample three or more "rolling test data" and process the obtained rolling test data using a least-square method.

In this way, the crosstalk correction coefficients a and b may be calculated with higher precision.

According to the above-described calibration method of the first embodiment, the crosstalk correction coefficients a and b of the multi-component force detector provided in the rolling resistance testing machine 1 may be highly precisely calibrated without spending any trouble or time, and hence fx may be accurately obtained (from the measurement data of one tire T).

Second Embodiment

Next, a method of calibrating a multi-component force detector of a second embodiment will be described.

The calibration method of the second embodiment uses a multi-component force detector capable of measuring fx, fz, fy, and nix differently from that of the first embodiment, and performs a calibration of the crosstalk correction coefficient c of fy' in addition to the crosstalk correction coefficients a and b. In this way, when the crosstalk of fy may be also considered at the same time, fx may be measured with higher precision.

Here, in, a case of the tire T attached in the front surface direction and rotating forward and the tire T attached in the rear surface direction and rotating backward, fy is theoretically set to the identical value in the positive and negative inversion states. Thus, when both rolling resistances are equal to each other in the positive and negative inversion states, the component of fy' is canceled, and hence the crosstalk correction coefficient c of fy' may not be obtained.

Therefore, in the second embodiment, the calibration of the crosstalk correction coefficients a, b, and c is performed on the assumption that the rolling resistance of the tire attached in the front surface direction and rotating forward is equal to the rolling resistance of the tire attached in the front surface direction and rotating backward in the positive and negative inversion states. In general, since the rolling resistances in the forward and backward rotation states are equal to each other, it is possible to establish an equation in which fx of the tire T facing the same direction has an identical value in the positive and negative inversion states. In this equation, since the component of fy' also remains, the crosstalk correction coefficient c may be calculated.

The calibration of the crosstalk correction coefficients a, b, and c of the second embodiment is performed according to the following procedure.

First, the tire T is prepared of which the rolling resistance coefficients (rolling resistance Fx/tire axial load Fz) in the forward and the backward rotation states are substantially equal to each other with necessary precision. Then, as in the first embodiment, the calibration coefficient a of the measurement value fx' in the rolling resistance direction with respect to fx is obtained as illustrated in FIG. 3.

When the calibration coefficient a or the crosstalk correction coefficients a, b, and c are considered, the rolling resistance fxcw1 which is measured by the multi-component force detector for the tire T attached in the front surface direction and rotating forward and the rolling resistance fxccw1 which is measured by the multi-component force detector for the tire T attached in the front surface direction and rotating backward are expressed as Equation (4).

$$fxcw1 = \alpha \cdot fxcw1' + a \cdot fzcw1' + b \cdot mxcw1'$$

$$fxccw1 = \alpha \cdot fxccw1' + a \cdot fzccw1' + b \cdot mxccw1' \quad (4)$$

Meanwhile, as described above, in the second embodiment, it is assumed that the rolling resistance fxcw1 of the tire T attached in the front surface direction and rotating forward and the rolling resistance fxccw1 of the tire T attached in the front surface direction and rotating backward are equal to each other in the positive and negative inversion states as illustrated in Equation (b) at the same rotation speed and the same pressing load.

$$fxcw1 = -fxCcw1 \quad (b)$$

Furthermore, when Equation (a) of the first embodiment is assumed, the term of fy disappears. Accordingly, in the embodiment, it is desirable to provide the assumption of Equation (b).

From Equation (4) and Equation (b), Equation (5) is derived.

$$\alpha \cdot (fxcw1' + fxccw1') + a \cdot (fzcw1' + fzccw1') + b \cdot (mxcw1' + mxccw1') + c \cdot (fycw1' + fyccw1') = 0 \quad (5)$$

Furthermore, the relation of Equation (5) is also established in the tire T which is attached in the rear surface direction. That is, an assumption is established in which the rolling resistance fxcw2 measured by the multi-component force detector for the tire T attached in the rear surface direction and rotating forward and the rolling resistance fxccw2 measured by the multi-component force detector for the tire T attached in the rear surface direction and rotating backward are equal to each other in the positive and negative inversion states. Thus, Equation (6) below is established.

$$\alpha \cdot (fxcw2' + fxccw2') + a \cdot (fzcw2' + fzccw2') + b \cdot (mxcw2' + mxccw2') + c \cdot (fycw2' + fyccw2') = 0 \quad (6)$$

In Equation (5) or Equation (6) obtained as described above, the values of three variables are not given. Accordingly, when three equations of Equation (2), Equation (3), Equation (5), and Equation (6) are used by one tire T in order to solve this equation (in other words, to obtain a calibration matrix from the calibration coefficient), the crosstalk correction coefficients a, b, and c may be accurately calculated to be calibrated, and hence the actual rolling resistance Fx may be accurately obtained.

Furthermore, the high crosstalk correction coefficients a, b, and c may be further highly precisely calculated by sampling a plurality of (four or more) rolling test data and performs a process on the sampled rolling test data using a least-square method. It is possible to evaluate whether the plurality of rolling test data become a linear independent data group by a singular value decomposition.

Third Embodiment

Next, a method of calibrating a multi-component force detector of a third embodiment will be described.

When performing the calibration methods of the first embodiment and the second embodiment, the spindle shaft 5 attached with the tire T or the bearing provided in the rotation shaft of the rotation drum is largely influenced by a rotational friction. When the rotational friction is added to the measurement value of the rolling resistance, there is a case in which the measurement of fx' or the calibration of the crosstalk correction coefficient may not be easily performed with high precision. In such a case, the calibration method described in the third embodiment is effective.

Figure 5:
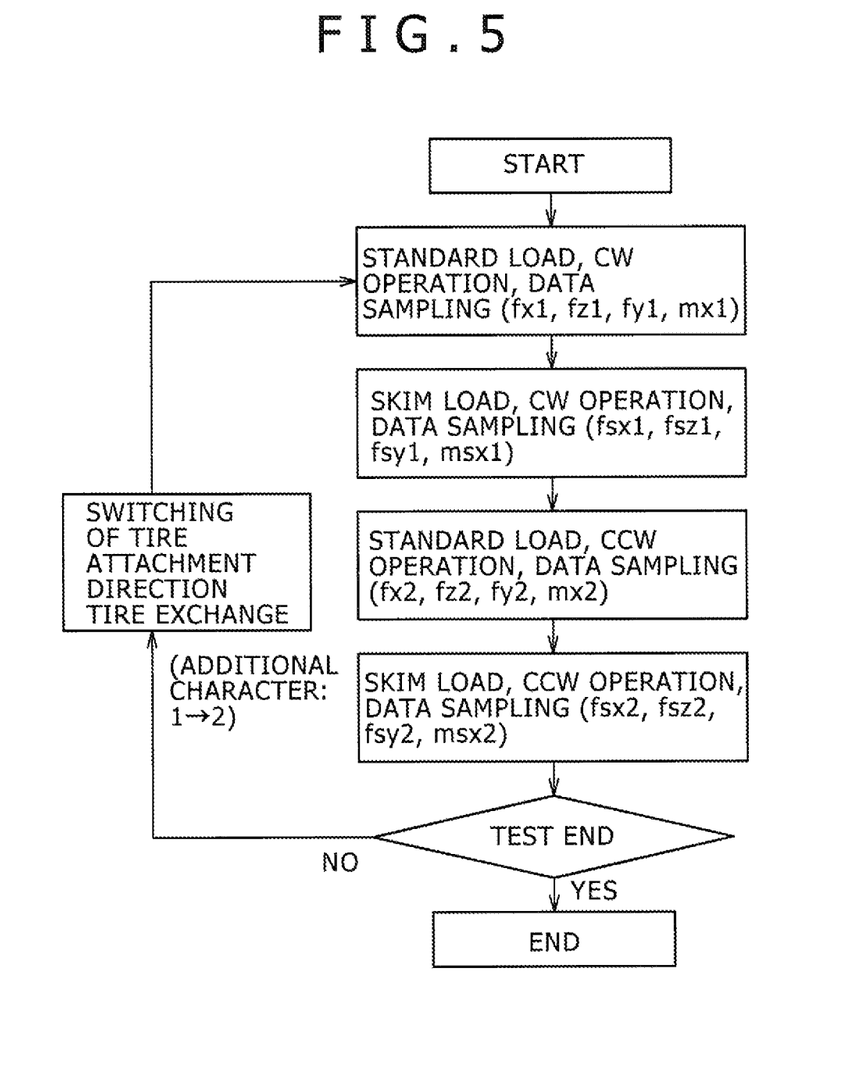
FIG. 5 is a flowchart illustrating a calibration method according to a third embodiment.

That is, as illustrated in FIG. 5, in the calibration method of the third embodiment, a calibration is performed by inputting a "differential load" obtained by subtracting a measurement value obtained by a skim load (a load different from a test load) from a measurement value in which an axial load (a pressing load in the z direction) is obtained by the test load instead of directly inputting the measurement value measured by the multi component force detector to fx', fz', fy', and mx' used to obtain the "rolling test data" in the first embodiment and the second embodiment.

The calibration of the crosstalk correction coefficient of the third embodiment is performed according to the following procedure.

First, as in the first embodiment and the second embodiment, the calibration coefficient a of the measurement value fx' of the rolling resistance with respect to the actual rolling resistance fx is obtained.

Then, the tire T is rotated as the clockwise rotation CW (the forward rotation direction) while the tire T is pressed against the running drum 3 at the standard load (for example, 5000 N), and fx1, fz1, fy1, and mx1 are measured by the multi-component force detector.

Next, the load that presses the tire T against the running drum 3 is changed to the skim load (for example, 100 N) smaller than the standard load, the tire T is rotated in the clockwise rotation CW while the tire T is pressed against the running drum 3 at the skim load, and fsx1, fsz1, fsy1, and msx1 are measured by the multi-component force detector. At this time, the rolling resistance has a small value. Furthermore, the tire running speed is set to be equal other than the condition of the axial load.

In both the skim load and the standard load, the load component or the torque component caused by the rotational friction generated in the spindle shaft 5 or the bearing of the running drum 3 overlaps as an error amount. For this reason, as illustrated in Equation (7), when the measurement value obtained by the skim load is subtracted from the measurement value obtained by the test load, fx1', fz1', fy1', and may be obtained with higher precision.

$$fx1' = fx1 - fsx1$$

$$fz1' = fsz1 - fsz1 \quad (7)$$

$$fy1' = fy1 - fsy1$$

$$mx1' = mx1 - msx1$$

fx1', fz1', fy1', and mx1' obtained as described above are applied to fxcw1', fzcw1', fycw1', and mxcw1' of Equation (2) and Equation (5).

Next, the rotation direction of the tire T is changed, and the skim load and the standard load when rotating the tire T in the counter-clockwise direction CCW (the reverse rotation direction) are sampled in the same manner as that of the clockwise rotation direction CW. After obtaining the data when rotating the tire T attached in the front surface direction forward and the data when rotating the tire backward in this way, the attachment direction of the tire T is reversed.

Then, the data when rotating the tire T attached in the rear surface direction forward and the data when rotating the tire backward are sampled in the same manner as that of the tire T which is attached in the front surface direction.

Based on the data of the tire T which is attached in the rear surface direction and rotates backward, fx2', fz2', fy2', and mx2' may be obtained based on Equation (8) with higher precision.

$$fx2' = fx2 - fsx2$$

$$fz2' = fz2 - fsz2 \quad (8)$$

$$fy2' = fy2 - fsy2$$

$$mx2' = mx2 - msx2$$

By applying fx2', fy2', and mx2' obtained as described above to fxccw2', fzccw2', fyccw2', and mxccw2' of Equation (2) and Equation (6), the calibration coefficient may be obtained by the methods of the first embodiment and the second embodiment.

The "rolling test data" obtained as described above are the data obtained by subtracting the load component or the torque component caused by the rotational friction generated in the spindle shaft 5 or the bearing of the running drum 3. Thus, when the data items having reduced error components are used, the crosstalk correction coefficient may be further reliably and highly precisely calibrated.

Furthermore, it should be considered that all embodiments disclosed herein are examples and do not limit the invention. Particularly, in the embodiments disclosed herein, the content which is not described as expression, for example, a running condition, an operation condition, various parameters, a component dimension, a component weight, a component volume, or the like do not deviate from the scope which is normally set by the person skilled in the art, and employs a value which may be easily supposed by the person skilled in the art, This application has been described in detail by referring to the specific embodiments, but it is apparent that various modifications or corrections may be made by the person skilled in the art without departing from the spirit and the scope of the invention.

This application claims benefit of Japanese Patent Application (Japanese Patent Application No 2010-288252) filed on Dec. 24, 2010, which is hereby incorporated by reference.

REFERENCE NUMERALS 1 rolling resistance testing machine
2 simulated road surface
3 running drum
4 carriage
4a vertical wall portion
5 spindle shaft
6 motor
8 housing
9 linear guide
10 hydraulic cylinder
11 control unit
12 measurement unit
13 calibration unit
14 load detector
15 bearing
T tire

The invention claimed is:

1. A method of calibrating a multi-component force detector provided in a rolling resistance testing machine including a spindle shaft attached with a tire and a running drum with a simulated road surface for pressing the tire thereon, the method comprising steps of:
providing the multi-component force detector to the spindle shaft (5) of the rolling resistance testing machine;
measuring multi-component forces with the multi-component force detector using a crosstalk correction coefficient for calibrating an influence of crosstalk occurring in the multi-component force detector; and
calculating a force acting on the tire based on the measurement values of the multi-component force detector;
wherein the crosstalk correction coefficient is calibrated by using rolling test data obtained by the multi-component force detector and an equation obtained by setting that two rolling resistances acting on the multi-component force detector in different conditions are equal to each other in forward and backward states.

2. The method of calibrating a multi-component force detector provided in a rolling resistance testing machine according to claim 1,
wherein the two rolling resistances indicate the rolling resistance of the tire which is attached in the front surface direction and rotates forward and the rolling resistance of the tire which is attached in the rear surface direction and rotates backward.

3. The method of calibrating a multi-component force detector provided in a rolling resistance testing machine according to claim 1,
wherein the two rolling resistances indicate the rolling resistance of the tire which is attached in the front surface direction and rotates forward and the rolling resistance of the tire which is attached in the front surface direction and rotates backward.

4. The method of calibrating a multi-component force detector provided in a rolling resistance testing machine according to claim 1,
wherein the spindle shaft is attached with the multi-component force detector, and
wherein when the multi-component force detector is able to measure a load fx in the x axis, a load fz in the z axis, and a moment mx about the x axis on the assumption that the tangential direction of the running drum is set as the x axis, the axis direction of the spindle shaft is set as the y axis, and the direction of the load applied to the tire is set as the z axis, the crosstalk correction coefficients of fz and mx with respect to fx are calibrated by using the rolling data which include fx, fz, and mx and are linearly independent from one another.

5. The method of calibrating a multi-component force detector provided in a rolling resistance testing machine according to claim 1,
wherein the spindle shaft is attached with the multi-component force detector, and
wherein when the multi-component force detector is able to measure a load fx in the x axis, a load fz in the z axis, a load fy in the y axis, and a moment mx about the x axis on the assumption that the tangential direction of the running drum is set as the x axis, the axis direction of the spindle shaft is set as the y axis, and the direction of the load applied to the tire is set as the z axis, the crosstalk correction coefficients of fz, fy and mx with respect to fx are calibrated by using the rolling test data which include fx, fz, fy, and mx and are linearly independent from one another.

6. The method of calibrating a multi component force detector provided in a rolling resistance testing machine according to claim 1,
wherein a differential load is obtained by subtracting a measurement value of the multi component force detector obtained when the tire is pressed at a load different from a test load from a measurement value of the multi component force detector obtained when the tire is pressed against the running drum at the test load, and
wherein the crosstalk correction coefficient is calibrated by using the obtained differential load as the rolling test data.

* * * * *